United States Patent
Nakamura et al.

(10) Patent No.: US 7,458,226 B2
(45) Date of Patent: Dec. 2, 2008

(54) AIR CONDITIONING SYSTEM, VEHICULAR AIR CONDITIONING SYSTEM AND CONTROL METHOD OF VEHICULAR AIR CONDITIONING SYSTEM

(75) Inventors: Kojiro Nakamura, Tochigi (JP); Tadashi Shimada, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 522 days.

(21) Appl. No.: 11/010,579

(22) Filed: Dec. 14, 2004

(65) Prior Publication Data

US 2005/0132731 A1 Jun. 23, 2005

(30) Foreign Application Priority Data

Dec. 18, 2003 (JP) ............................ P 2003-420805
Mar. 31, 2004 (JP) ............................ P 2004-104878

(51) Int. Cl.
*F25B 1/00* (2006.01)
*F25B 41/04* (2006.01)

(52) U.S. Cl. ........................ 62/228.1; 62/228.3; 62/222; 62/229

(58) Field of Classification Search .................. 62/160, 62/222, 225, 176.3, 228.1, 228.3, 229, 210, 62/204

See application file for complete search history.

(56) References Cited

U.S. PATENT DOCUMENTS 5,245,836 A * 9/1993 Lorentzen et al. ............. 62/174
6,044,655 A * 4/2000 Ozaki et al. .................... 62/205

FOREIGN PATENT DOCUMENTS

JP        2932668 B2        5/1999

* cited by examiner

*Primary Examiner*—Chen-Wen Jiang
(74) *Attorney, Agent, or Firm*—Foley & Lardner LLP

(57) ABSTRACT

An air conditioning system comprises a compressor 2 which compresses a refrigerant made of carbon dioxide, a radiator 4 which radiates heat of the refrigerant compressed by the compressor 2, an expansion valve 5 which decompresses the refrigerant which dissipated heat by the radiator 4 and which can control a refrigerant pressure on the outlet side of the radiator 4, an evaporator 7 which evaporates the refrigerant decompressed by the expansion valve 5, a sensor 13 which detects temperatures of a surface of a pipe through which a high pressure refrigerant on the outlet side of the radiator passes, and a control apparatus 23 which calculates a target refrigerant pressure on the outlet side of the radiator 4 based on a value detected by the sensor to control the expansion valve 5. The control apparatus corrects the target refrigerant pressure on the outlet side of the radiator 4 corresponding to refrigerant temperatures. With this configuration, even if the temperature of the pipe surface is different from the actual refrigerant temperature, the air conditioning system can be controlled under an appropriate target refrigerant pressure.

5 Claims, 11 Drawing Sheets

AIR CONDITIONING SYSTEM, VEHICULAR AIR CONDITIONING SYSTEM AND CONTROL METHOD OF VEHICULAR AIR CONDITIONING SYSTEM

CROSS REFERENCE TO RELATED APPLICATIONS

This application is based upon and claims the benefit of priority from the prior Japanese Patent Application No. 2003-420805 filed on Dec. 18, 2003, and the prior Japanese Patent Application No. 2004-104878 filed on Mar. 31, 2004, the entire contents of which are incorporated herein by reference.

BACKGROUND OF THE INVENTION

1. Field of the Invention

The present invention relates to an air conditioning system and a vehicular air conditioning system using a refrigerant comprising carbon dioxide, and relates to a control method of the vehicular air conditioning system.

2. Description of Related Art

In an air conditioning system using a refrigerant comprising carbon dioxide ($CO_2$), since there is a high pressure refrigerant pressure value which is efficient with respect to a temperature of a high pressure refrigerant on the outlet side of a radiator, the temperature of the high pressure refrigerant on the outlet side of the radiator is detected to calculate a target refrigerant pressure, a pressure reducing unit such as an expansion valve is controlled based on the target refrigerant pressure bring the refrigerant pressure close to the target pressure. In the air conditioning system using a refrigerant comprising carbon dioxide, since the refrigerant pressure is high, if the number of joints is increased, the refrigerant tends to leak. Therefore, the refrigerant temperature is not measured directly, and the temperature of a pipe surface through which the refrigerant passes is measured. When the air conditioning system is applied to a vehicular air conditioning system, since it is necessary to increase the refrigerant pressure at an outlet of a radiator, an engine load is increased. Based on such a background, as disclosed in Japanese Patent No. 2931668, in the vehicular air conditioning system to which the air conditioning system is applied, opening of the expansion valve is adjusted such that the refrigerant pressure at the outlet of the radiator has a predetermined relation with respect to the refrigerant temperature at the outlet, thereby obtaining the maximum efficiency.

SUMMARY OF THE INVENTION

When an outside air temperature is extremely low, however, even if the refrigerant temperature increases, it takes time until the pipe surface temperature becomes equal to the refrigerant temperature due to thermal mass. Thus, if the pipe surface temperature is used as it is when the air conditioning system is started, an appropriate target refrigerant pressure cannot be calculated in some cases. In the case of a vehicular air conditioning system to which the air conditioning system is applied, as shown in FIG. 1, the opening of the expansion valve is controlled corresponding to a control line in which an outlet refrigerant pressure (Pd) is reduced corresponding to a reduction in the outlet refrigerant temperature (T1, T2). When the outside air temperature is low and the heating operation is carried out, the detected temperature becomes low, and it is determined that heating performance is obtained based on the control line, the outlet refrigerant pressure (Pd) is reduced (i.e., the opening of the expansion valve is increased) and thus, the air conditioning system is brought into a low ability operation state, and its genuine heating performance cannot be exhibited in some cases.

The present invention has been achieved in order to solve such problems, and it is an object of the invention to provide an air conditioning system that can be controlled under appropriate target refrigerant pressure even if the pipe surface temperature and the actual refrigerant temperature are different.

It is another object of the invention to provide a vehicular air conditioning system and a control method capable of enhancing the heating performance when the outside air temperature is low.

To achieve the above object, an air conditioning system according to the present invention comprises a compressor which compresses a refrigerant made of carbon dioxide, a radiator which radiates heat of the refrigerant compressed by the compressor, a pressure reducing unit which decompresses the refrigerant which dissipated heat by the radiator and which can control a refrigerant pressure on the outlet side of the radiator, an evaporator which evaporates the refrigerant decompressed by the pressure reducing unit, a sensor which detects temperature of a surface of a pipe through which a high pressure refrigerant on the outlet side of the radiator passes, and a control apparatus which calculates a target refrigerant pressure on the outlet side of the radiator based on a value detected by the sensor to control the pressure reducing unit, and the control apparatus corrects the target refrigerant pressure on the outlet side of the radiator corresponding to the refrigerant temperature.

In a vehicular air conditioning system utilizing a supercritical cycle according to the invention, the vehicular air conditioning system comprises a compressor which compresses a refrigerant and discharges the same, a radiator which heat-exchanges between the refrigerant discharged from the compressor and air flowing through an interior air passage, an expansion valve which expands the refrigerant discharged from the radiator, and an evaporator which heat-exchanges the refrigerant expanded by the expansion valve and the air flowing through the interior air passage, the vehicular air conditioning system further comprises a temperature sensor which detects temperatures of a refrigerant at an outlet of the radiator, and a control unit which stores one control line in which an opening of the expansion valve is increased corresponding to temperature rise of the refrigerant, and which controls the opening of the expansion valve corresponding to the one control line, and the control unit reduces, at the time of heating operation, the opening of the expansion valve corresponding to a reduction of the refrigerant temperature detected by the temperature sensor.

In a control method of a vehicular air conditioning system utilizing a supercritical cycle according to the invention, the vehicular air conditioning system comprises a compressor which compresses a refrigerant and discharges the same, a radiator which heat-exchanges between the refrigerant discharged from the compressor and air flowing through an interior air passage, an expansion valve which expands the refrigerant discharged from the radiator, and an evaporator which heat-exchanges the refrigerant expanded by the expansion valve and the air flowing through the interior air passage, the control method comprises the steps of: detecting temperatures of a refrigerant at an outlet of the radiator; and storing one control line in which an opening of the expansion valve is increased corresponding to temperature rise of the refrigerant, and controlling the opening of the expansion valve corresponding to the one control line, and the control step includes a step of reducing the opening of the expansion valve

DETAILED DESCRIPTION OF EMBODIMENTS

An embodiment of the present invention will be explained in detail with reference to the accompanying drawings.

Figure 1:
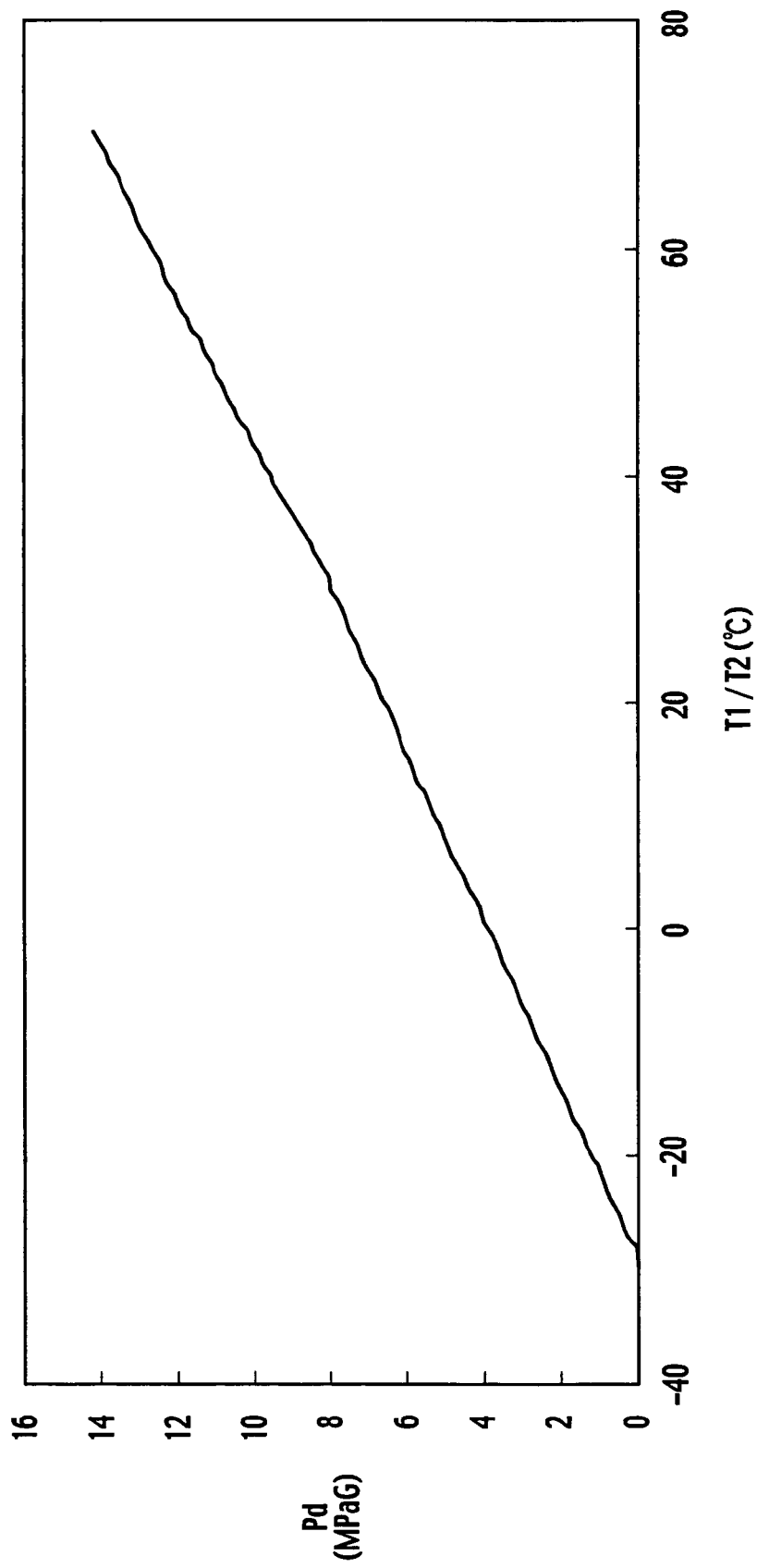
FIG. 1 is a graph showing a control line used in a conventional vehicular air conditioning system.
Figure 2:
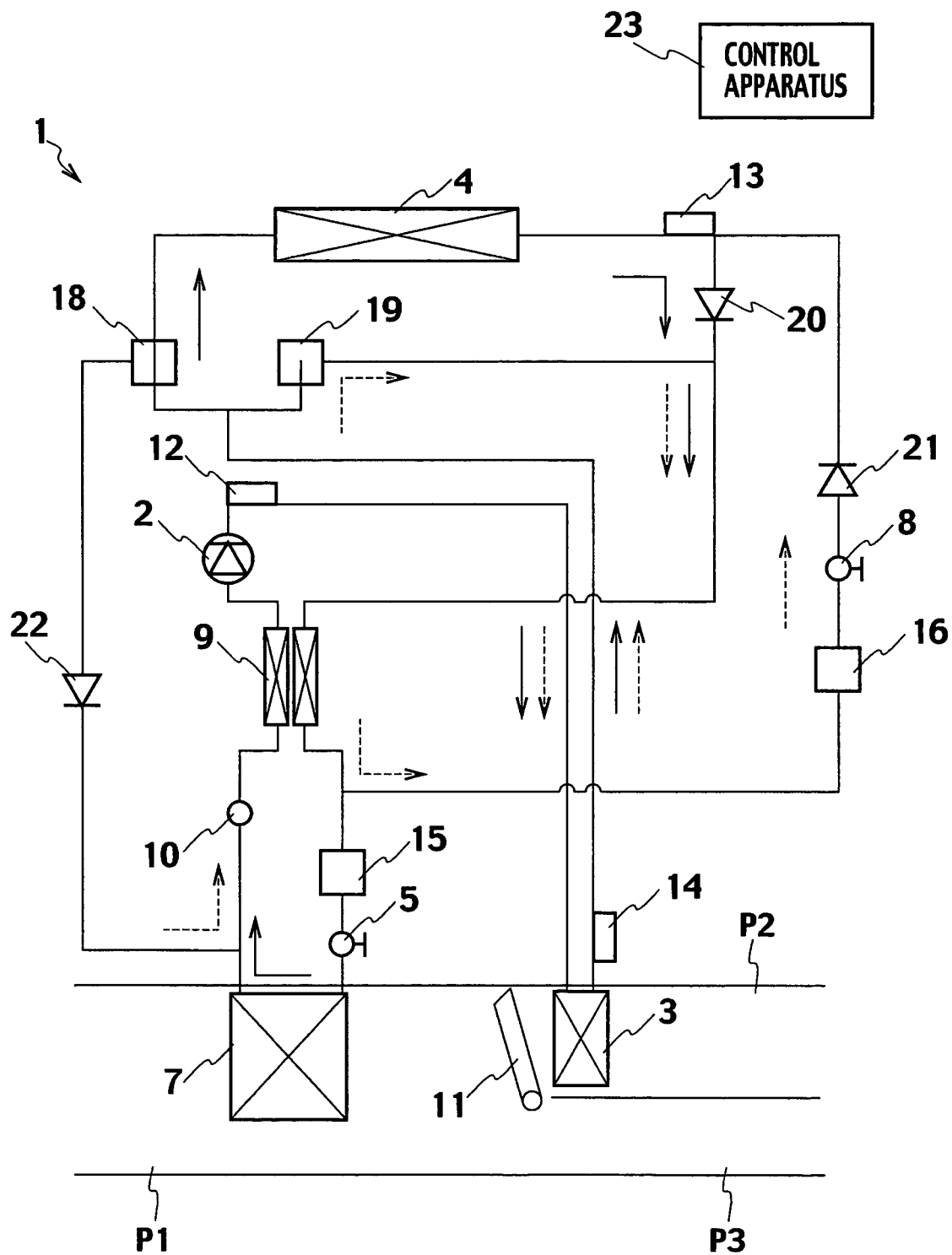
FIG. 2 is a schematic block diagram of an air conditioning system according to an embodiment of the present invention.

FIG. 2 is schematic block diagram of an air conditioning system according to the embodiment of the present invention.

The air conditioning system 1 is for a vehicle, and has a first refrigerant cycle and a second refrigerant cycle that circulates a refrigerant therethrough to heat-exchange between the refrigerant and air.

The first refrigerant cycle is used for a cooling operation. In the first refrigerant cycle, a compressor 2, radiators 3 and 4, an expansion valve 5 as a pressure reducing unit, and an evaporator 7 are connected to one another in this order through pipes. A refrigerant is circulated through these members in the direction shown by solid arrows.

On the other hand, the second refrigerant cycle is used for heating operations. In the second refrigerant cycle, the compressor 2, the radiator 3, an expansion valve 8 as a pressure reducing unit, and the radiator 4 (it functions as an evaporator at the time of the heating operation) are connected to one another in this order through pipes. A refrigerant is circulated through these members in the direction shown by broken arrows.

The compressor 2 is disposed outside the vehicle. The compressor 2 sucks and compresses a low pressure carbon dioxide gas refrigerant, and discharges the same as a high temperature and high pressure refrigerant. For example, the compressor 2 is an electric compressor that is operated when electricity is supplied.

The radiator 3 is disposed in an interior air passage P1. The radiator 3 radiates heat of a high temperature and high pressure refrigerant discharged from the compressor 2 into air flowing through the interior air passage P1. The air flowing through the interior air passage P1 absorbs heat of the refrigerant that dissipated heat by the radiator 3 and the air is heated.

The radiator 4 is disposed outside the passenger room. If an air blower (not shown) such as an electric fan is operated, outside air blows on the radiator 4. The radiator 4 heat-exchanges between the high temperature and high pressure refrigerant passing through the radiator 4 and outside air blowing on the radiator 4, and allows the refrigerant to radiate heat.

The expansion valve 5 decompresses the refrigerant that dissipated heat by the radiator 4. The refrigerant pressure on the outlet side of the radiator 4 can be controlled by adjusting the opening of a decompression hole of the expansion valve. The expansion valve 8 decompresses the refrigerant that dissipated heat by the radiator 3, and has the same configuration as that of the expansion valve 5.

The evaporator 7 is disposed upstream from the radiator 3 in the interior air passage P1, and heat of air flowing through the interior air passage P1 is absorbed by low temperature and low pressure refrigerant supplied from the expansion valve 5. That is, the refrigerant which is brought into low temperature and low pressure state by the expansion valve 5 is supplied to the evaporator 7, and when the refrigerant passes through the evaporator 7, the refrigerant absorbs heat of the air flowing through the interior air passage P1.

Air cooled by the evaporator 7 is distributed, at appropriate ratio, into a passage P2 passing through the radiator 3 and a passage P3 bypassing the radiator 3. Air flowing through the passage P2 and air flowing through the passage P3 are mixed in an air mix chamber (not shown) and is discharged out from an outlet (not shown) into the passenger room.

A reference numeral 9 represents an interior heat exchanger. The interior heat exchanger 9 heat-exchanges between the high pressure refrigerant compressed by the compressor 2 and a low pressure refrigerant absorbed heat at the evaporator 7.

An accumulator 10 is provided between the interior heat exchanger 9 and the evaporator 7. The accumulator 10 separates the carbon dioxide refrigerant that passed through the evaporator 7 into a liquid refrigerant and a gas refrigerant, and sends only the gas refrigerant to the compressor 2, and temporarily stores the liquid refrigerant in the accumulator 10.

A reference numeral 12 represents a sensor that detects the temperature of a refrigerant discharged from the compressor 2. Reference numerals 13 and 14 respectively represent sensors that detect the temperature of surfaces of pipes through which high pressure refrigerants on the outlet sides of the radiators 4 and 3. Reference numerals 15 and 16 respectively represent sensors that detect the pressures of refrigerants on the inlet sides of the expansion valves 5 and 8. A reference numeral 18 represents a cross valve, a reference numeral 19 represents a solenoid valve, and reference numerals 20 to 22 represent check valves.

A reference numeral 23 represents a control apparatus comprising a microcomputer. The control apparatus 23 controls the expansion valves 5 and 8, the cross valve 18, the solenoid valve 19, the air mix door 11 and other equipment based on values detected by the sensors 12 to 16 and other sensor, and input information from an operation panel (not shown).

Figure 3:
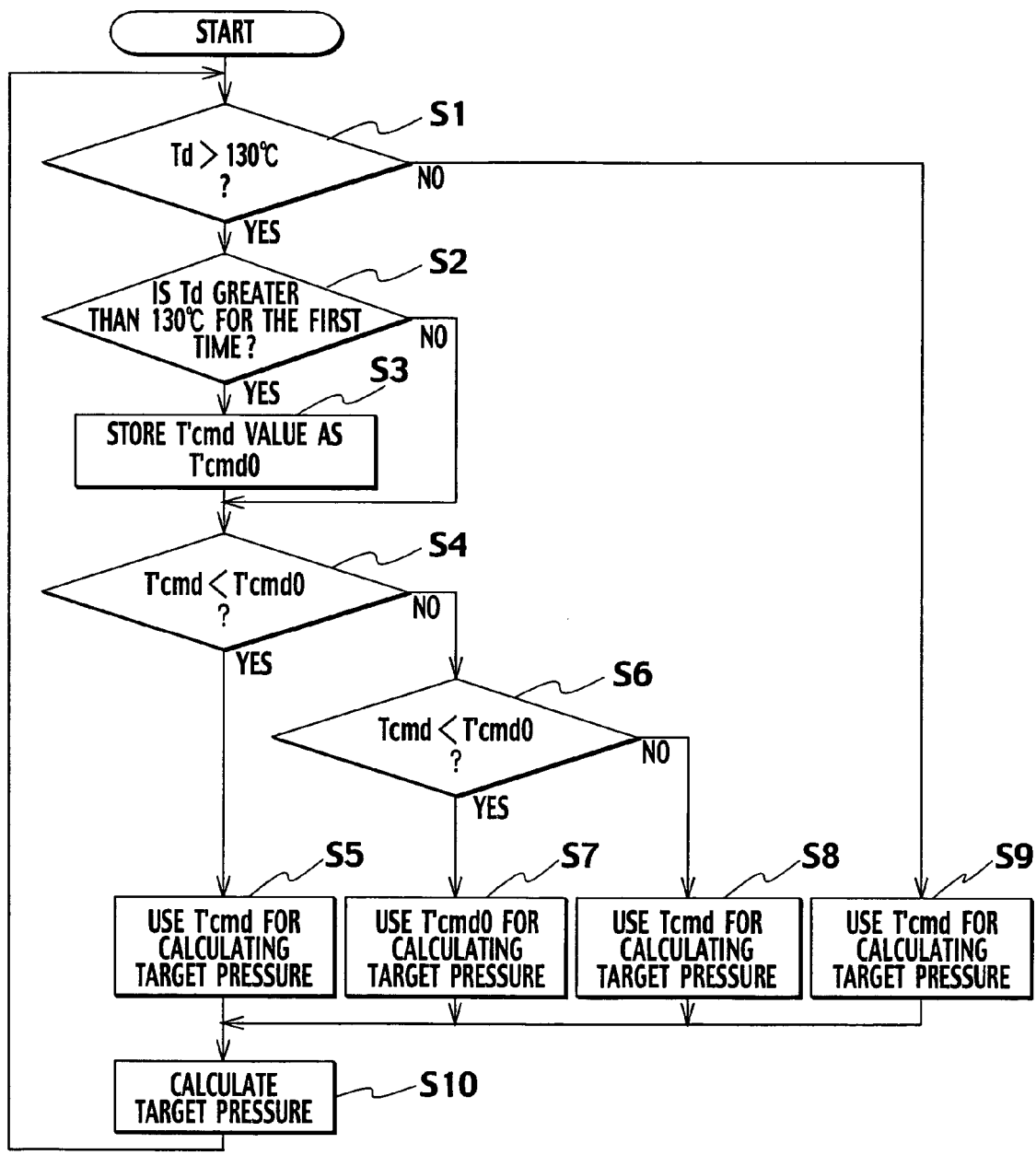
FIG. 3 is a flowchart showing a calculating procedure of a target refrigerant pressure on the outlet side of a radiator according to a control apparatus of a first embodiment.
Figure 4:
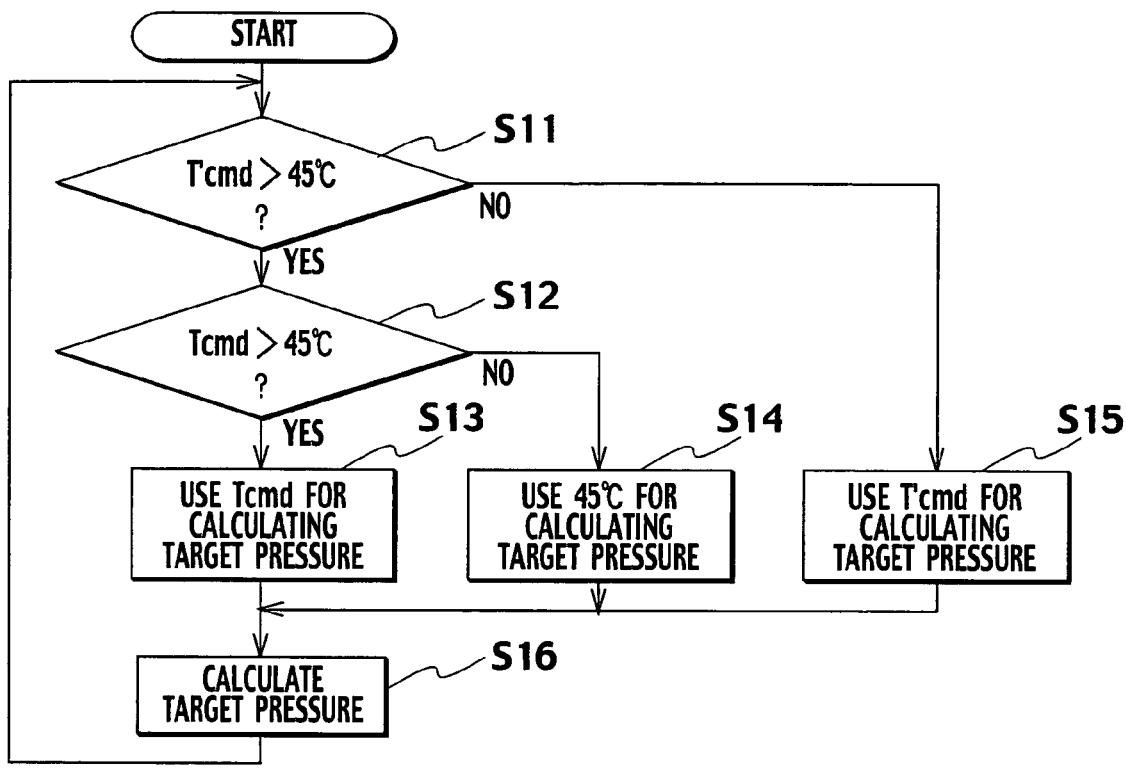
FIG. 4 is a flowchart showing a calculating procedure of a target refrigerant pressure on the outlet side of a radiator according to a control apparatus of a second embodiment.

The calculating procedure of a target refrigerant pressure on the outlet side of the radiator carried out by the control apparatus of the first embodiment will be explained based on a flowchart shown in FIG. 3. Here, the explanation is based on the cooling operation (refrigerant is circulated as shown by solid arrows in FIG. 2).

First, at step S1, determination is made whether a value detected by the sensor 12, i.e., a discharged refrigerant temperature Td of the compressor 1, is larger than 130° C.

If NO, procedure is proceeded to step S9, where Tcmd obtained by adding a predetermined value (e.g., 5° C.) to a value Tcmd detected by the sensor 13 is used as the refrigerant temperature for calculating the target refrigerant pressure on the outlet side of the radiator 4, the target pressure is calculated at step S10, and the procedure is returned to step S.

If YES at step S1, the procedure is proceeded to step S2, and determination is made whether Td is determined larger than 130° C. for the first time.

If YES at step S2, the procedure is proceeded to step S3, a predetermined value is added to the value detected by the sensor 13 as Tcmd, and the Tcmd is stored in a memory.

The stored value is a correction upper limit value of the refrigerant temperature for calculating the target refrigerant pressure on the outlet side of the radiator 4. The stored value is called Tcmd0 to distinguish the value from Tcmd calculated in other steps.

If NO at step S2, the procedure at step S3 is not carried out, and procedure is proceeded to step S4.

At step S4, determination is made whether Tcmd obtained by adding a predetermined value to the value Tcmd detected by the sensor 13 is smaller than the stored value Tcmd0

If YES, the procedure is proceeded to step S5, where T'cmd is used for calculating the target refrigerant pressure on the outlet side of the radiator 4, the target pressure is calculated at step S10, and the procedure is returned to step S1.

If NO at step S4, the procedure is proceeded to step S6, where determination is made whether the stored value Tcmd0 is larger than the value T'cmd detected by the sensor 13.

If YES, the procedure is proceeded to step S7, where it is determined that the stored value T'cmd0 is used for calculating the target refrigerant pressure on the outlet side of the radiator 4, the target pressure is calculated at step S10, and the procedure is returned to step S1.

If NO at step S6, the procedure is proceeded to step S8, where it is determined that the value Tcmd detected by the sensor 13 is used for calculating the target refrigerant pressure on the outlet side of the radiator 4, the target pressure is calculated at step S10, and the procedure is returned to step S1.

By correcting the target refrigerant pressure on the outlet side of the radiator 4 corresponding to the temperature of the refrigerant discharged from the compressor 2 in this manner, even when the pipe surface temperature detected by the sensor 13 is different from the actual refrigerant temperature, the expansion valve 5 can be controlled with an appropriate target refrigerant pressure. Therefore, the starting operation of the air conditioning system is enhanced, and comfortable air conditioning operation can be carried out.

In this embodiment, the correction upper limit value (T'cmd0) of the refrigerant temperature for calculating the target refrigerant pressure is set, and the refrigerant temperature is corrected such that the refrigerant temperature does not exceed the upper limit value. Thus, overshoot is prevented from being generated after the system is warmed, and air conditioning control without waste can be carried out.

Next, a calculating procedure of the target refrigerant pressure on the outlet side of the radiator carried out by the control apparatus of a second embodiment will be explained.

In this embodiment, the target refrigerant pressure on the outlet side of the radiator 4 is corrected corresponding to the refrigerant temperature on the outlet side of the radiator 4.

First, at step S11, determination is made whether T'cmd obtained by adding the predetermined temperature to the value Tcmd detected by the sensor 13 on the outlet side of the radiator 4 is larger than 45° C.

If NO, the procedure is proceeded to step S15, where it is determined that T'cmd is used for calculating the target refrigerant pressure on the outlet side of the radiator 4, the target refrigerant pressure is calculated at step S16, and the procedure is returned to step S11.

If YES at step S11, the procedure is proceeded to step S12, where determination is made whether the value Tcmd detected by the sensor 13 is larger than 45° C.

If YES, the procedure is proceeded to step 13, where it is determined that Tcmd is used for calculating the target refrigerant pressure on the outlet side of the radiator 4, the target pressure is calculated at step S16, and the procedure is returned to step S11.

If NO at step S12, the procedure is proceeded to step S14, where it is determined that 45° C. is used for calculating the target refrigerant pressure on the outlet side of the radiator 4, the target pressure is calculated at step S16, and the procedure is returned to step S11.

By correcting the target refrigerant pressure on the outlet side of the radiator 4 corresponding to the refrigerant temperature on the outlet side of the radiator 4 in this manner, even when the pipe surface temperature detected by the sensor 13 is different from the actual refrigerant temperature, the expansion valve 5 can be controlled with an appropriate target refrigerant pressure. Therefore, the starting operation of the air conditioning system is enhanced, and comfortable air conditioning operations can be carried out.

In this embodiment, the correction upper limit value (45° C.) of the refrigerant temperature for calculating the target refrigerant pressure is set, and the refrigerant temperature is corrected such that the refrigerant temperature does not exceed the upper limit value. Thus, overshoot is prevented from being generated after the system is warmed, and air conditioning control without wastefulness can be carried out.

While the present invention is applied to the cooling system in this embodiment, the invention can also be applied to a heating system. In the heating system, a difference between the actual refrigerant temperature and the pipe surface temperature at the time of starting operation of the system is large in many cases. Therefore, if the present invention is applied to the heating system, remarkably excellent effect can be obtained.

It is also effective if the invention is applied to a vehicular air conditioning system that is used outside in low temperatures.

The invention can also be applied to an air conditioning system in which its compressor is driven by engine power.

The same effect can be obtained even if the same control method (target refrigerant pressure on the outlet side of the radiator is corrected corresponding to the refrigerant temperature) is applied to an air conditioning system having a refrigerant cycle using a relatively high pressure refrigerant comprising material other than carbon dioxide, in which the target refrigerant pressure on the outlet side of the radiator is calculated based on the pipe surface temperature on the outlet side of the radiator, and the pressure reducing unit is controlled based on this operation.

Figure 5:
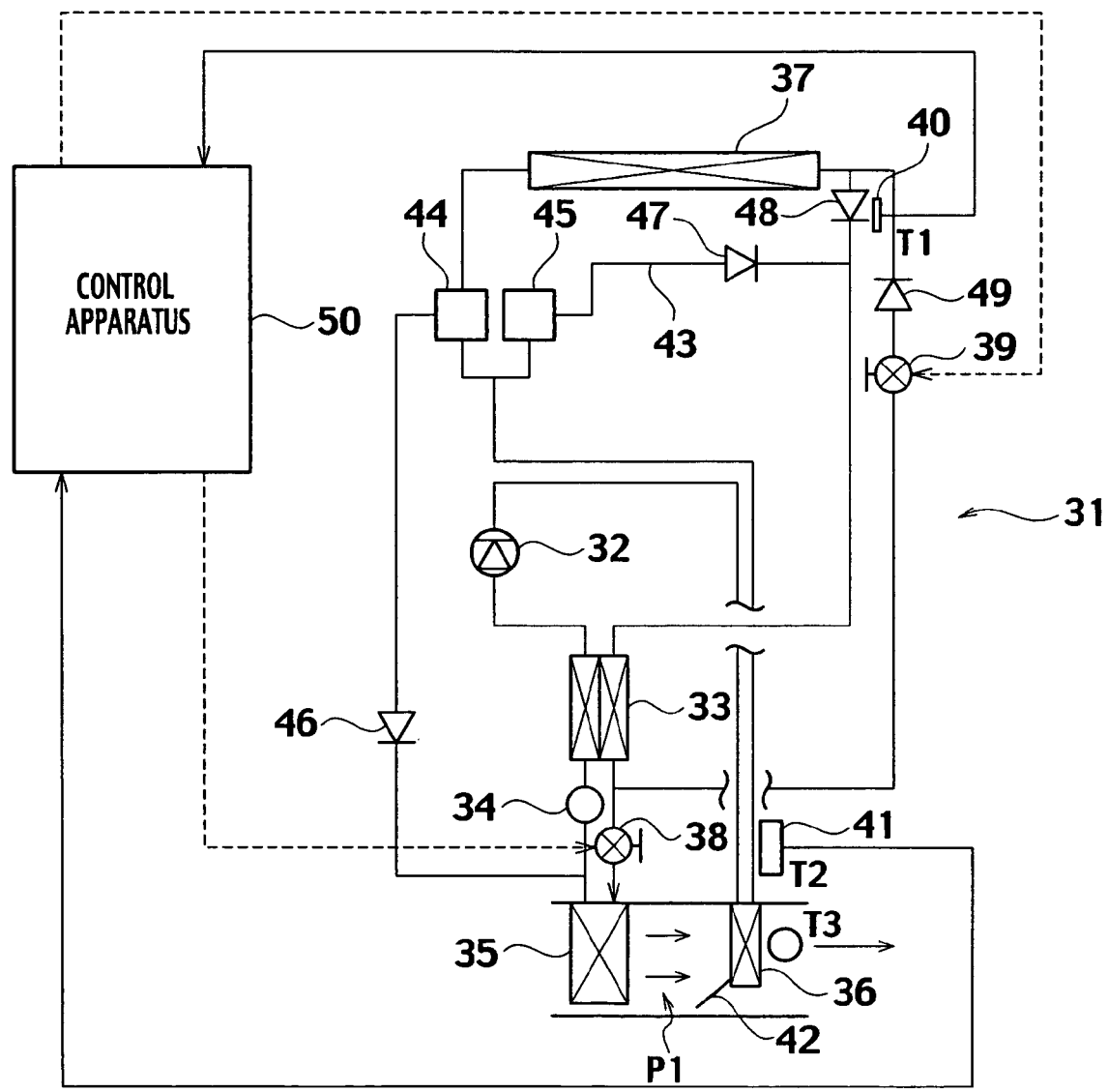
FIG. 5 is a block diagram of a vehicular air conditioning system according to an embodiment of the invention.

Next, a configuration of a vehicular air conditioning system according to an embodiment of the present invention will be explained with reference to FIG. 5.

The vehicular air conditioning system 31 of the embodiment of the invention utilizes a supercritical cycle using carbon dioxide ($CO_2$) as a refrigerant. As shown in FIG. 5, the vehicular air conditioning system 31 includes a compressor 32 which compresses the refrigerant, an interior heat exchanger 33 which heat-exchanges between the high pressure refrigerant compressed by the compressor 32 and a low pressure refrigerant absorbed heat at the evaporator 35, an accumulator 34 which separates the refrigerant into a gaseous phase refrigerant and a liquid phase refrigerant and allows only the gaseous phase refrigerant to flow into the compressor 32, an evaporator 35 which cools and dehumidifies air flowing through an interior air passage P1 at the time of cooling operation, a radiator 36 which heats air flowing through the interior air passage P1, an outdoor heat exchanger 37 which heat-exchanges between the refrigerant and outside air, an expansion valve 38 which expands the refrigerant flowing into the evaporator 35, and an expansion valve 39 which expands the refrigerant which flows into the outdoor heat exchanger 37 at the time of a later-described heat pump heating operation. The interior heat exchanger 33 is provided for enhancing response time to ability increasing requirement of the supercritical cycle, and it is not always necessary to provide the interior heat exchanger 33.

The vehicular air conditioning system 31 includes a temperature sensor 40 which detects the outlet refrigerant temperature (T1) of the outdoor heat exchanger 37 at the time of cooling operation, a temperature sensor 41 which detects the outlet refrigerant temperature (T2) of the radiator 36 at the time of heating operation, an air mix door 42 which controls a passage of air flowing through the interior air passage P1, a bypass pipe 43 that the refrigerant bypasses so that the refrigerant does not pass through the outdoor heat exchanger 37 at the time of later-described dehumidifying and heating operation, and a cross valve 44 and a solenoid valve 45 which switch the passages of the refrigerant so that the refrigerant flows through either the outdoor heat exchanger 37 or the bypass pipe 43.

The vehicular air conditioning system 31 further includes a check valve 46 which prevents a refrigerant from reversely flowing toward the outdoor heat exchanger 37 at the time of heat pump operation, a check valve 47 which prevents a refrigerant flowing through the bypass pipe 43 from reversely flowing, a check valve 48 which prevents the refrigerant from reversely flowing from the interior heat exchanger 33 toward the outdoor heat exchanger 37 at the time of cooling operation, and a check valve 49 which prevents a refrigerant from reversely flowing from the outdoor heat exchanger 37 toward the interior heat exchanger 33 at the time of heat pump operation. A reference numeral T3 represents temperature of a refrigerant at an outlet of the radiator 36, and is detected by a sensor not illustrated in the figure.

In the vehicular air conditioning system 31, a control apparatus 50 stores one control line (see FIG. 11) in which the refrigerant pressure (Pd) is reduced as the outlet refrigerant temperatures (T1, T2) are reduced. The vehicular air conditioning system 31 is controlled corresponding to the control line.

In the vehicular air conditioning system 31 having such a configuration, the control apparatus 50 controls the openings of the expansion valves 38 and 39 corresponding to values detected by the temperature sensors 40 and 41, and carries out the dehumidifying and heating operation, and the cooling operation. The operation of the vehicular air conditioning system 31 when the cooling operation, the heat pump heating operation and the dehumidifying and heating operation are carried out will be explained with reference to FIGS. 6 to 8.

Figure 6:
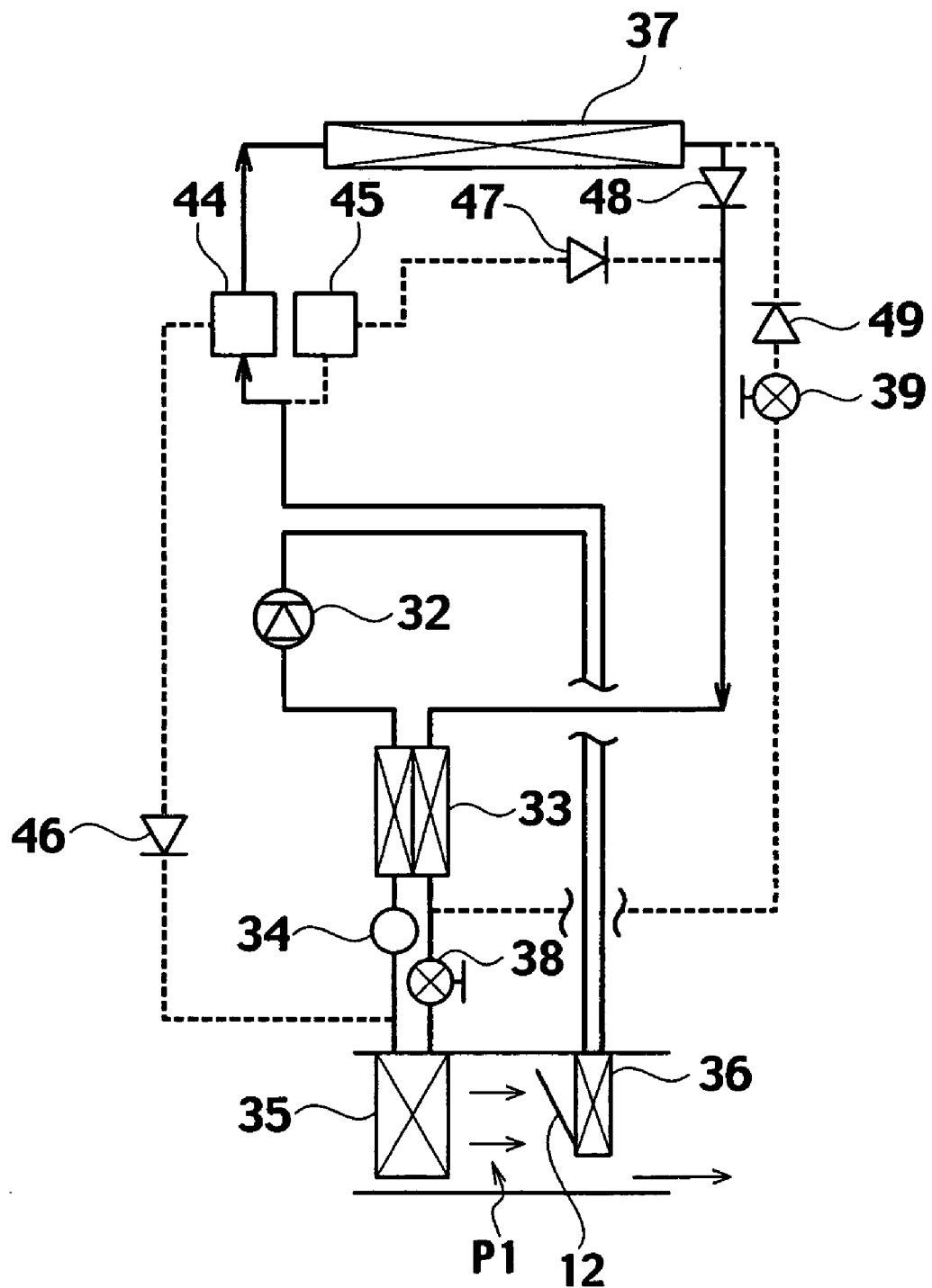
FIG. 6 is a block diagram of a refrigerant cycle when a cooling operation of the vehicular air conditioning system shown in FIG. 5 is carried out.

First, referring to FIG. 6, the operation of the vehicular air conditioning system 31 at the time of the cooling and heating operation will be explained.

At the time of the cooling and heating operation, the air mix door 42 is switched so that air flowing through the interior air passage P1 does not come into contact with the radiator 36. Then, the refrigerant is compressed into the high temperature and high pressure state by the compressor 32, passes the radiator 36 and the cross valve 44, and flows into the outdoor heat exchanger 37. In the outdoor heat exchanger 37, the refrigerant dissipated heat by heat-exchanging between the outside air, and the refrigerant flows into the interior heat exchanger 33. In the interior heat exchanger 33, the refrigerant heat-exchanges between the refrigerant flowing such as to be opposed to the interior heat exchanger 33.

The refrigerant which heat-exchanged in the interior heat exchanger 33 is expanded by the expansion valve 38 and is brought into a low temperature and low pressure state and then, the refrigerant flows into the evaporator 35 to cool air flowing through the interior air passage P1. The control apparatus 50 detects the outlet refrigerant temperature (T1) of the outdoor heat exchanger 37 by the temperature sensor 40, and the outlet refrigerant pressure (Pd) of the control line corresponding to the detected outlet refrigerant temperature (T1) is calculated, thereby determining the opening of the expansion valve 38. Then, the refrigerant which passed the evaporator 35 passes the accumulator 34, and is sent to the interior heat exchanger 33, and heat-exchanged between the refrigerant flowing such as to be opposed to the former refrigerant in the interior heat exchanger 33 and then, the $CO_2$ refrigerant returns to the compressor 32.

Figure 7:
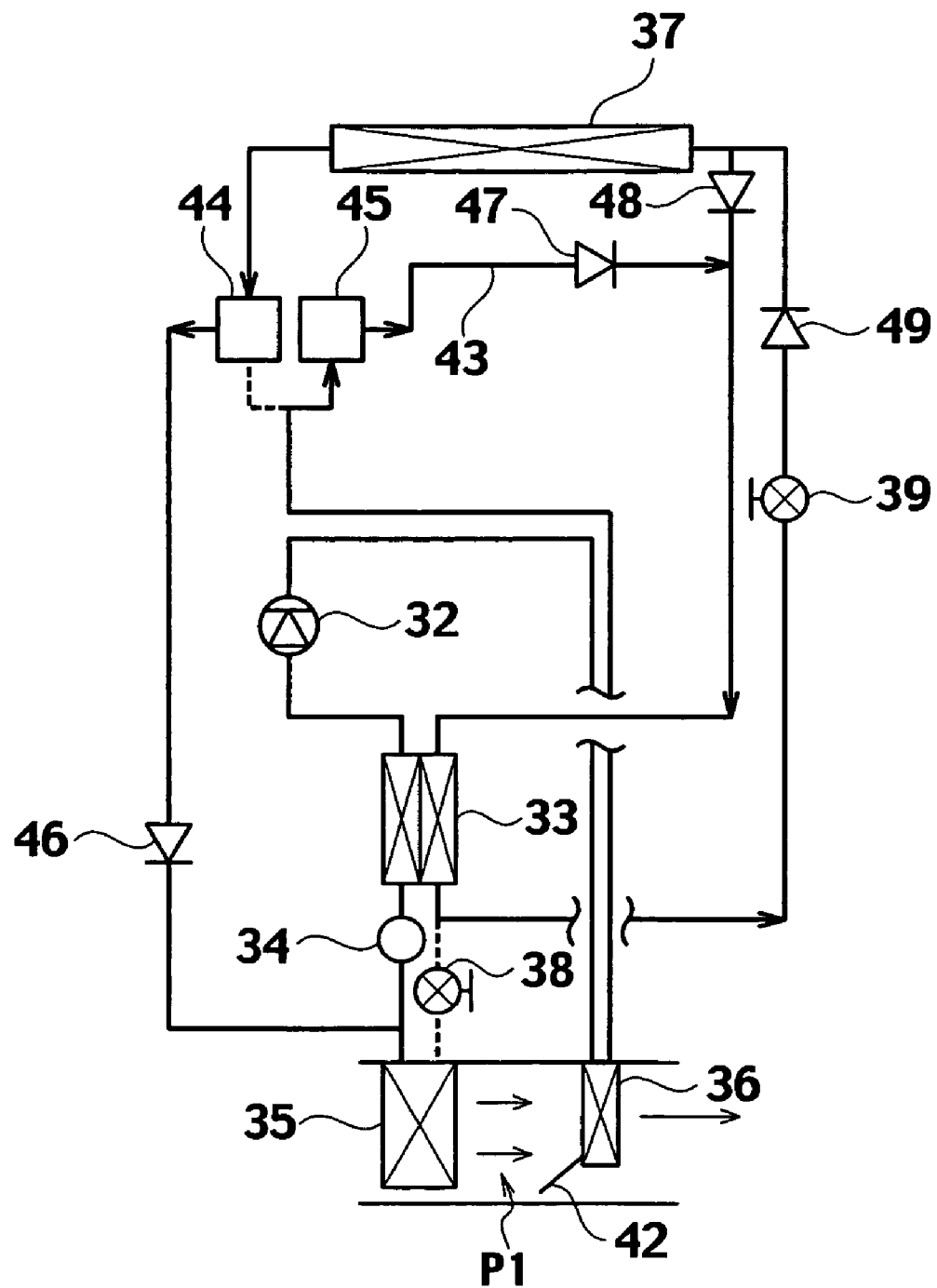
FIG. 7 is a block diagram of a refrigerant cycle when a heat pump heating operation of the vehicular air conditioning system shown in FIG. 5 is carried out.

Next, the operation of the vehicular air conditioning system 31 at the time of the heat pump heating operation will be explained with reference to FIG. 7.

At the time of the heat pump heating operation, the air mix door 42 is switched such that air flowing through the interior air passage P1 passes the radiator 36. Then, the refrigerant is compressed into a high temperature and high pressure state by the compressor 32, and flows into the radiator 36. The radiator 36 heat-exchanges between the refrigerant and air flowing through the interior air passage P1, thereby heating the air flowing through the interior air passage P1. The refrigerant that dissipated heat passes the bypass pipe 43, flows into the interior heat exchanger 33, and heat-exchanges between the refrigerant which flows in the interior heat exchanger 33 such as to be opposed to the former refrigerant.

The refrigerant that heat-exchanged in the interior heat exchanger 33 is expanded by the expansion valve 39. Then, the refrigerant flows into the outdoor heat exchanger 37, heat-exchanges between itself and outside air in the outdoor heat exchanger 37, and the refrigerant absorbs heat. The control apparatus 50 detects the outlet refrigerant temperature (T2) of the radiator 36 by the temperature sensor 41, and the outlet refrigerant pressure (Pd) of the control line corresponding to the detected outlet refrigerant temperature (T2) is calculated, thereby determining the opening of the expansion valve 39. Then, the refrigerant that passed the outdoor heat exchanger 37 passes the cross valve 44, the check valve 46 and the accumulator 34, and flows into the interior heat exchanger 33. Then, the refrigerant heat-exchanges between refrigerant that flows in the interior heat exchanger 33 such as to opposed to the former refrigerant in the interior heat exchanger 33, and then, returns to the compressor 32.

Figure 8:
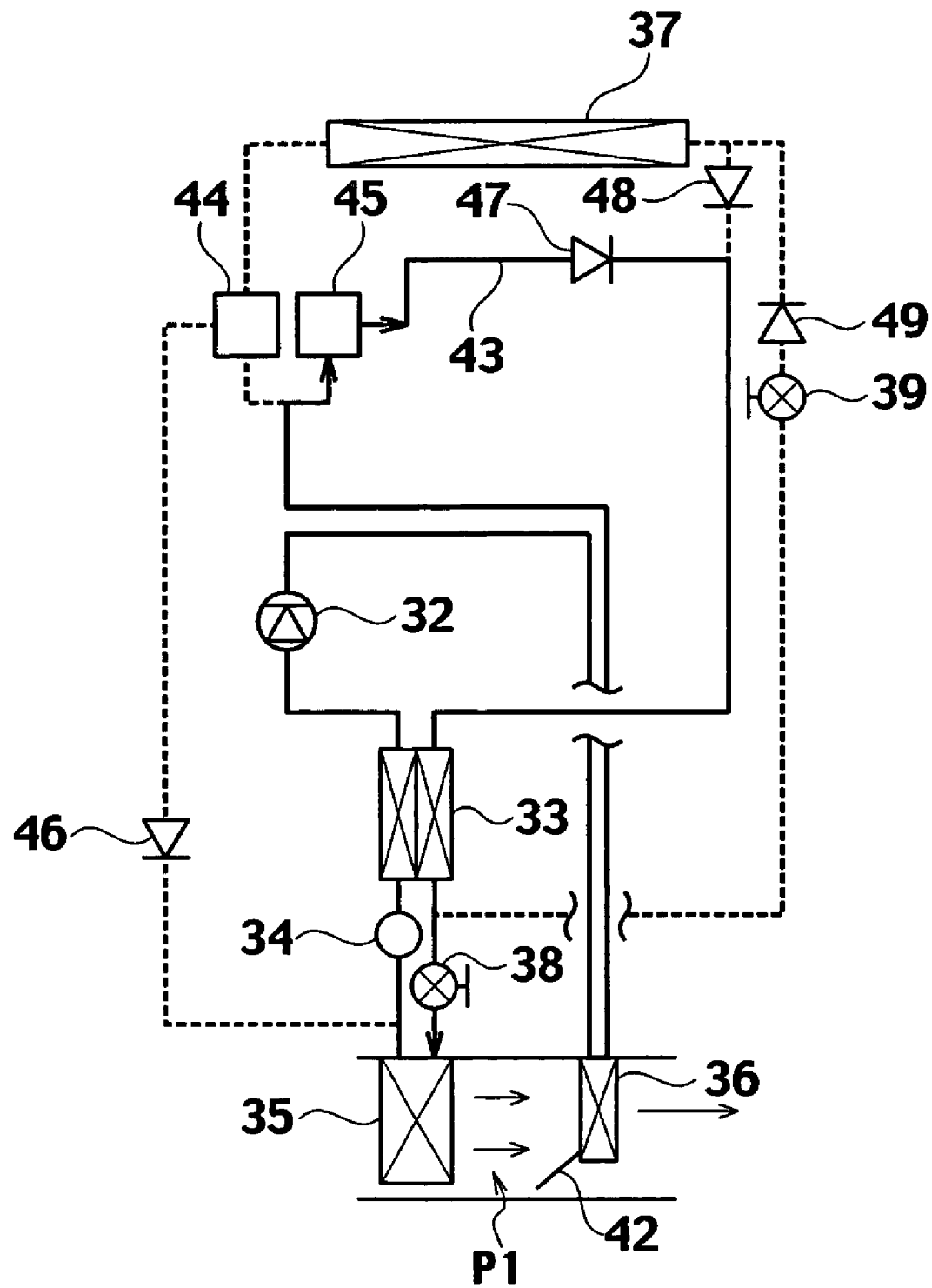
FIG. 8 is a block diagram of a refrigerant cycle when a dehumidification and heating operation of the vehicular air conditioning system shown in FIG. 5 is carried out.

Next, the operation of the vehicular air conditioning system 1 at the time of dehumidifying and heating operation will be explained with reference to FIG. 8.

At the time of the dehumidifying and heating operation, the air mix door 42 is switched such that air flowing through the interior air passage P1 comes into contact with the radiator 36. Then, the refrigerant is compressed into the high temperature and high pressure state by the compressor 32, and flows into the radiator 36. The radiator 36 heat-exchanges between the refrigerant and air flowing through the interior air passage P1, thereby heating the air flowing through the interior air passage P1. The refrigerant heat-exchanged in the radiator 36 passes bypass pipe 43, and flows into the interior heat exchanger 33. Then, the refrigerant heat exchanges between the refrigerant that flows in the interior heat exchanger 33 such as to be opposed to the former refrigerant.

The refrigerant that heat-exchanged in the interior heat exchanger 33 is expanded by the expansion valve 38 and then allowed to flow into the evaporator 35. The refrigerant is evaporated in the evaporator 35 thereby dehumidifying air which flows through the interior air passage P1. Details of the control procedure of the expansion valve will be explained later with reference to a flowchart shown in FIG. 9. Thereafter, the refrigerant that passed the evaporator 35 passes the accumulator 34, and flows into the interior heat exchanger 33. The refrigerant heat-exchanges between the refrigerant that flows such as to be opposed to the former refrigerant in the interior heat exchanger 33 and returns to the compressor 32.

In the vehicular air conditioning system 31, in order to enhance the heating performance at the time of the dehumidifying and heating operation at a low temperature, the control apparatus 50 carries out the later-described control procedure of the expansion valve, and the opening of the expansion valve 38 is reduced corresponding to a reduction of the outlet refrigerant temperature T2 of the radiator 36.

The control procedure of the expansion valve at the time of the dehumidifying and heating operation will be explained with reference to the flowchart shown in FIG. 9.

Figure 9:
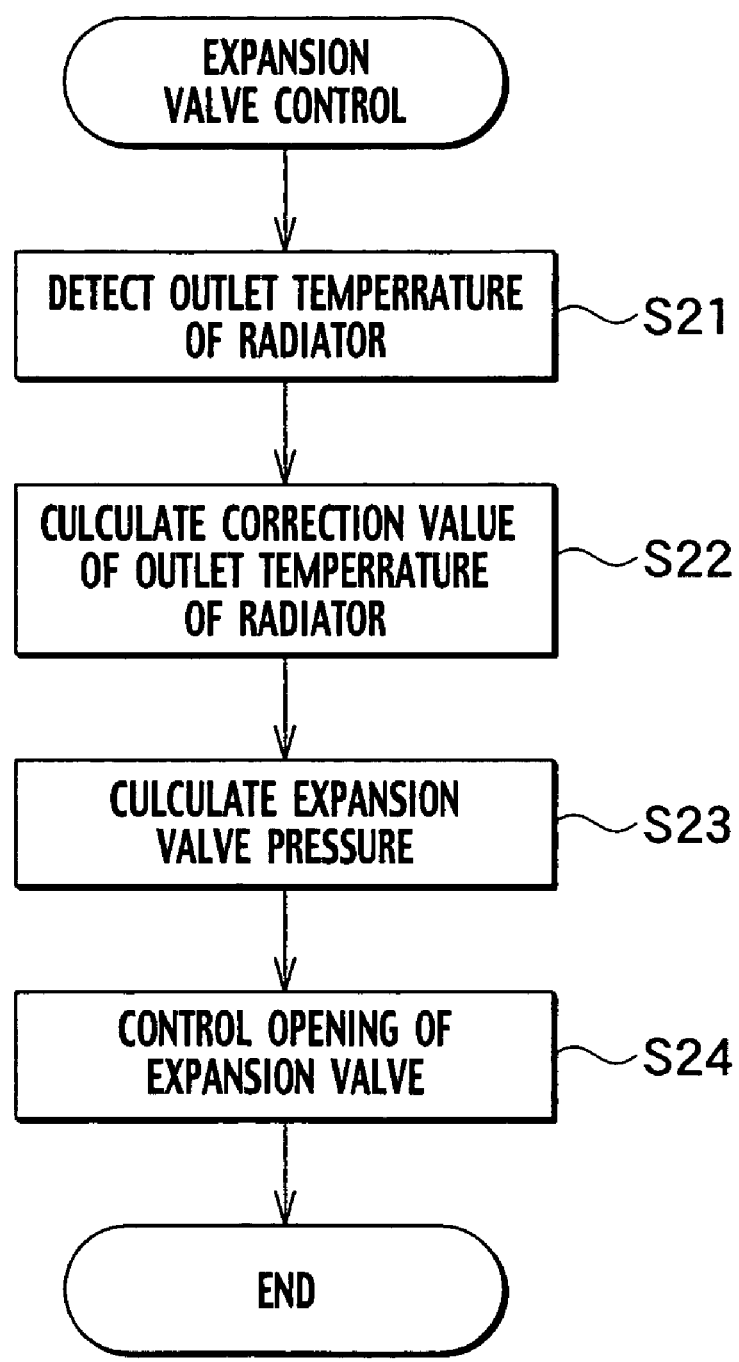
FIG. 9 is a flowchart showing a flow of a control procedure of an expansion valve when the dehumidification and heating operation is carried out.

The flowchart shown in FIG. 9 is started when commanded to carry out the dehumidifying and heating operation. The control procedure of the expansion valve is proceeded to step S21.

At step S21, the control apparatus 50 refers to a value detected by the temperature sensor 41, and detects the outlet refrigerant temperature T2 of the radiator 36. With this operation, the procedure at step S21 is completed, and the control procedure of the expansion valve is proceeded to step S22 from step S21.

At step S22, the control apparatus 50 substitutes the detected outlet refrigerant temperature T2 into the following mathematical expression, thereby calculating a correction value of the outlet refrigerant temperature T2. With this calculation, the procedure at step S22 is completed, the control procedure of the expansion valve is proceeded to step S23 from step S22. In the following mathematical expression, reference numeral T0, R represents target temperature of a refrigerant at an outlet of the radiator 36 and a constant value defined according to characteristics of the air conditioning system respectively.

$$T_2 \rightarrow T_2 + (T0+T3)/R$$

Figure 10A:
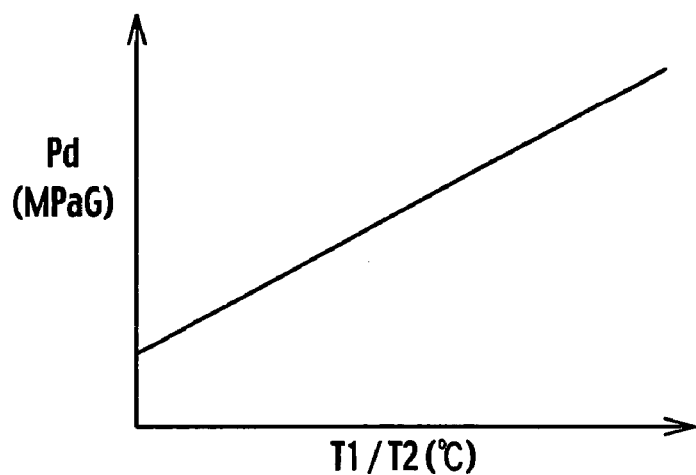
FIGS. 10A and 10B are explanatory views for explaining the control procedure of the expansion valve shown in FIG. 9.
Figure 10B:
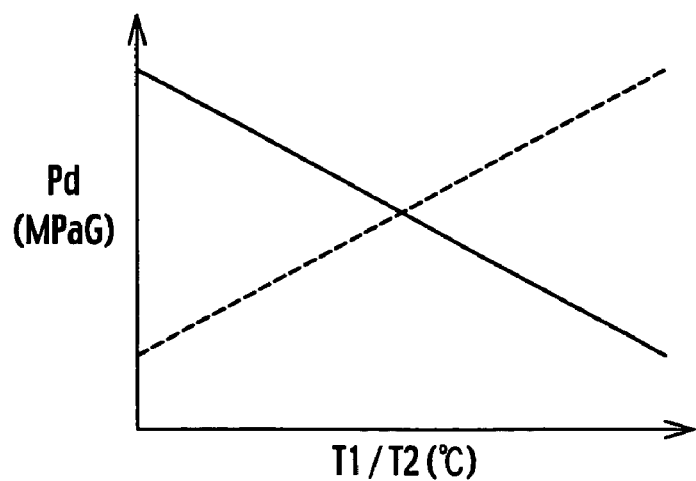

At step S23, the control apparatus 50 refers to the control line and extracts the expansion valve pressure corresponding to the correction value of the outlet refrigerant temperature T2. That is, in the procedure at step S S22 and S23, the control apparatus 50 converts the one control line from a state shown in FIG. 10A to a state shown in FIG. 10B, and the control apparatus 50 refers to the converted control line and extracts the expansion valve pressure. With this operation, the procedure at step S23 is completed, and the control procedure of the expansion valve is proceeded to step S24 from step S23.

At step S24, the control apparatus 50 controls the opening of the expansion valve such that the pressure becomes equal to the expansion valve pressure extracted at step S23. With this operation, the procedure at step S24 is completed, and the series of control procedure of the expansion valve is completed.

As is apparent from the above explanation, according to the vehicular air conditioning system 31 of the embodiment, the control apparatus 50 reduces the opening of the expansion valve 39 corresponding to a reduction of the outlet refrigerant temperature T2 of the radiator 36 at the time of the heating operation. Therefore, the pressure of the refrigerant on the outlet side of the radiator 36 is increased, and the heating performance can be enhanced when the outside air temperature is low.

Figure 11:
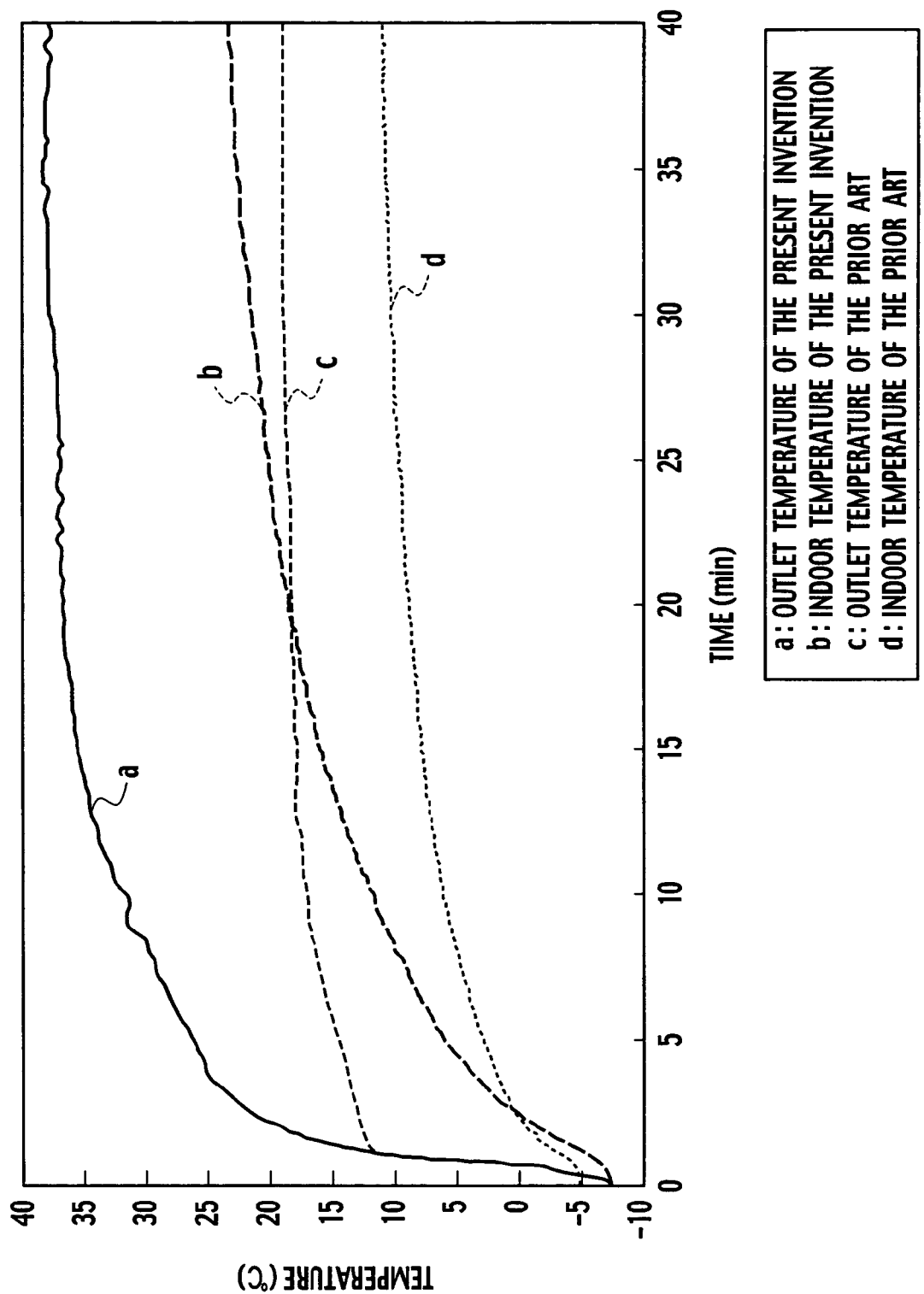
FIG. 11 is a graph showing heating performances of the vehicular air conditioning system according to the invention and according to a conventional vehicular air conditioning system.

According to the vehicular air conditioning system 31 of the embodiment, the control apparatus 50 corrects the temperature of refrigerant detected by the temperature sensor 41, and reduces the opening of the expansion valve 39 corresponding to a reduction of the outlet refrigerant temperature T2 of the radiator 36. Therefore, as shown in FIG. 11, the heating performance when the outside air temperature is low can be enhanced as compared with the conventional vehicular air conditioning systems.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An air conditioning system comprising:

a compressor which compresses a refrigerant made of carbon dioxide, a radiator which radiates heat of the refrigerant compressed by the compressor, a pressure reducing unit which decompresses the refrigerant which had heat dissipated by the radiator and which can control a refrigerant pressure on an outlet side of the radiator, an evaporator which evaporates the refrigerant decompressed by the pressure reducing unit, a sensor which detects a temperature of a surface of a pipe through which a high pressure refrigerant on the outlet side of the radiator passes, and a control apparatus which calculates a target refrigerant pressure on the outlet side of the radiator based on a value detected by the sensor to control the pressure reducing unit, wherein the control apparatus corrects the target refrigerant pressure on the outlet side of the radiator based on a temperature of refrigerant discharged from the compressor.

2. The air conditioning system according to claim 1, wherein the control apparatus corrects the target refrigerant pressure based on the value detected by the sensor.

3. The air conditioning system according to claim 1, wherein the control apparatus sets a correction upper limit value and corrects the target refrigerant pressure such that the target refrigerant pressure does not exceed the correction upper limit value.

4. The air conditioning system according to claim 1, wherein the air conditioning system is a heating system.

5. The air conditioning system according to claim 1, wherein the air conditioning system is a vehicular air conditioning system.

* * * * *